United States Patent [19]

Mulvany

[11] 3,843,967

[45] Oct. 22, 1974

[54] STORAGE SYSTEM HAVING A UNIVERSAL DISK DRIVE AND A FAMILY OF DATA MODULES

[75] Inventor: Richard Burke Mulvany, San Jose, Calif.

[73] Assignee: International Business Machines Corporation, Armonk, N.Y.

[22] Filed: Feb. 26, 1973

[21] Appl. No.: 336,116

[52] U.S. Cl. .................................. 360/98, 360/133

[51] Int. Cl. ............................................ G11b 5/82

[58] Field of Search ............................. 360/98, 133

[56] References Cited

UNITED STATES PATENTS

| | | | |
|---|---|---|---|
| 3,524,540 | 8/1970 | Brown et al. | 340/174.1 C |
| 3,566,381 | 2/1971 | Buslik et al. | 340/174.1 C |
| 3,577,133 | 5/1971 | Gartein | 340/174.1 C |
| 3,643,240 | 2/1972 | Raiser | 340/174.1 C |
| 3,710,357 | 1/1973 | Buslik et al. | 340/174.1 C |

*Primary Examiner*—Vincent P. Canney
*Attorney, Agent, or Firm*—Robert W. Keller; Edward M. Suden

[57] ABSTRACT

A random access storage system is disclosed. The system comprises a family of data modules, the family being comprised of a plurality of different classes, each class being defined by the number of magnetic storage disks within the data module associated with that class, all data modules within any class being interchangeable with data modules of the same class and any other class, and a universal disk drive for connecting to any data module of the family of data modules.

5 Claims, 6 Drawing Figures

STORAGE SYSTEM HAVING A UNIVERSAL DISK DRIVE AND A FAMILY OF DATA MODULES

CROSS-REFERENCE TO RELATED APPLICATIONS

Copending patent application Ser. No. 206,688, now U.S. Pat. No. 3,786,454, filed Dec. 10, 1971 on behalf of R. B. Mulvany and R. W. Lissner, entitled "Magnetic Disk Storage Apparatus" and assigned in common to the same assignee, discloses the mechanical and electrical structure and interfaces necessary to carry out this invention. Accordingly, the entire teachings of said patent are incorporated by reference in this specification.

Copending patent application Ser. No. 303,748 entitled "Actuator-Carriage Coupling," filed Nov. 6, 1972 on behalf of C. P. Barnard et al and assigned in common to the same assignee teaches an embodiment of the mechanical coupling between the actuator and the carriage and, in particular, a key-pin assembly which locks an actuator to a slotted carriage latch plate. The teachings of application Ser. No. 303,748 are incorporated by reference in this specification.

Copending patent application Ser. No. 231,320, entitled "Magnetic Disk Apparatus," filed on Mar. 20, 1972 on behalf of D. E. Cuzner et al and assigned in common to the same assignee, teaches a random access storage system in which the host disk drive supplies electrical energization to an actuatable arm disposed within a disk pack.

BACKGROUND OF THE INVENTION

1. Field of the Invention

This invention relates to a random access storage system and, more particularly, to a system which comprises a family of data modules including a plurality of different classes, all data modules within any class being interchangeable with data modules of the same or any other class, and a universal disk drive for connecting to any data module of the family.

2. Description of the Prior Art

Random access storage systems employ either fixed media or removable media. In fixed media systems the medium or magnetic disk is permanently disposed on its associated disk drive. Presently, removable media random access storage systems employ a disk drive that is uniquely designed to cooperate with a single class of interchangeable disk packs. These systems provide a single storage capacity. Because of this one-to-one correspondence between a disk drive system and its storage capacity, different capacity systems are required to fulfill different data processing requirements.

The present invention overcomes this and other difficulties and limitations by providing an improved random access storage system with different storage capacities.

It is an object of this invention to provide an improved random access storage system comprising in combination a family of data modules, the family being comprised of a plurality of different classes, each class being defined by the number of magnetic storage disks within the data module associated with that class, all modules within any class being interchangeable with data modules of the same class and any other class, and a universal disk drive for connecting to any data module of the family of data modules.

In accordance with the preceding object, it is still another object to provide such a storage system wherein all data modules have three combined mechanical and electrical interfaces, the three interfaces being in a specific spatial relationship.

Still a further object in accordance with the preceding objects is to provide such a system wherein each of the modules comprises at least one magnetic disk, transducing means for transducing information on each of the magnetic disks, accessing means for moving the transducing means to a selected position with respect to the magnetic disk, and a drive spindle means on which the at least one magnetic disk is seated, and wherein the universal drive includes means for rotatably driving the spindle means and coupled to the module at a first mechanical interface, means for selectively energizing the accessing means and coupled to the module at a second interface which is either mechanical or electrical, and means for electrically energizing the transducing means and coupled to the module at an electrical interface.

Still another object is to provide a random access storage system as set forth above wherein the data module includes means for indicating the number of magnetic storage disks therein and wherein the universal drive comprises means for sensing the indicated means.

Yet another object is to provide a family of data modules that are interchangeable and that can be used on the same drive without modification, thus allowing a customer to configure a disk subsystem to match his current needs. Thus, as customer needs increase, he simply increases the size of the data module to arrive at the desired capacity. As in other systems more drives can be added to satisfy a growth in on-line requirements. This system for the first time includes the capability to increase a user data base by simply substituting a larger size data module without modifying the disk drive.

It is still another object to provide a random access storage system which provides great flexibility. In this system the data module is a sealed cartridge enclosing the heads and the disks. Thus preventive maintenance is eliminated, and since the heads and the disks are maintained together precise radial head positioning on a desired track is insured because there is no module to module tolerance buildup.

Other objects and advantages of the invention will be pointed out in the following description and claims and illustrated in the accompanying drawings which disclose, by way of example, the principle of the invention and the best mode which has been contemplated of applying that principle.

In this application "interchangeable" shall refer to a medium, such as a disk module, that has universal substitution without loss of data for use on all the devices with which it is developed to work. To be truly interchangeable, all of the hardware elements involved in the mechanical, electronic and magnetic implementation of storage must have sufficient repeatability, so that the summation of all of the deviations from perfection, for all elements, does not exceed the total variance, i.e., engineering tolerance allowed.

"Family" is a group of classes related by common characteristics or properties.

BRIEF DESCRIPTION OF THE DRAWINGS

The invention will be described in greater detail with reference to the drawings in which.

Similar numerals refer to similar elements throughout the drawing.

DESCRIPTION OF THE PREFERRED EMBODIMENT

Figure 1:
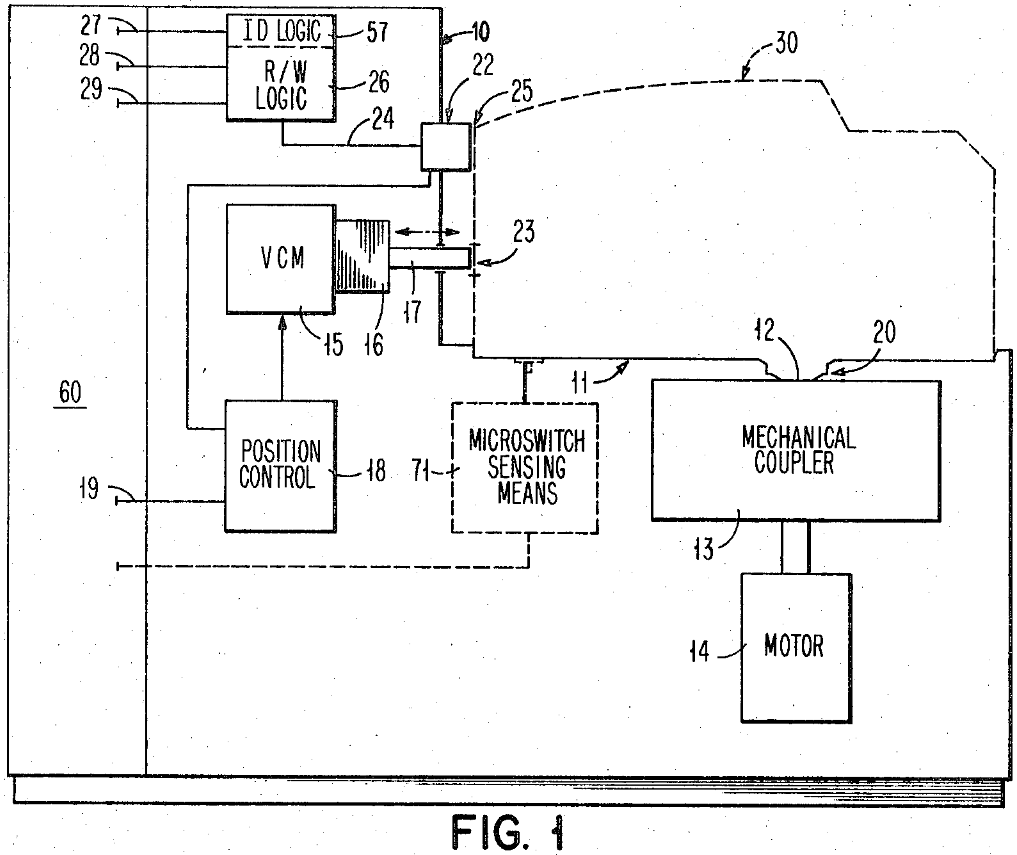
FIG. 1 is a diagrammatic view of the universal disk drive of this invention.
Figure 2:
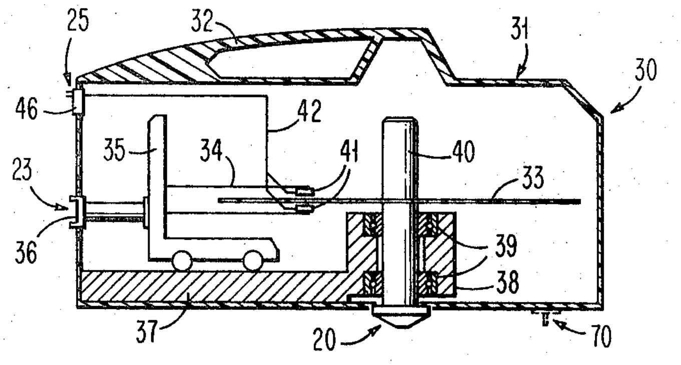
FIGS. 2 and 3 are diagrammatic views of two classes of the family of data modules, each having different number of storage disks.
Figure 3:
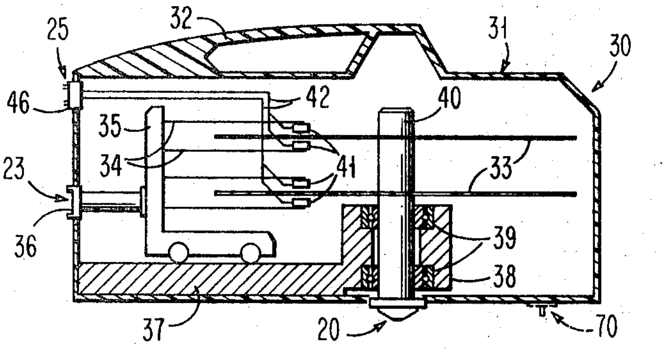

Referring to the drawings, there is shown in FIGS. 1, 2 and 3 diagrammatic views of the universal disk drive and of two classes of the family of data modules which comprise the random access storage system of this invention. As illustrated in FIG. 1, the universal disk drive 10 includes a data module receiving means or tray 11, a spindle drive motor 14 for rotating the disks, an accessing drive motor or actuator 15 and its associated voice coil assembly, and appropriate electronics for energizing and controlling the actuator and the electronics within a data module 30.

Figure 6:
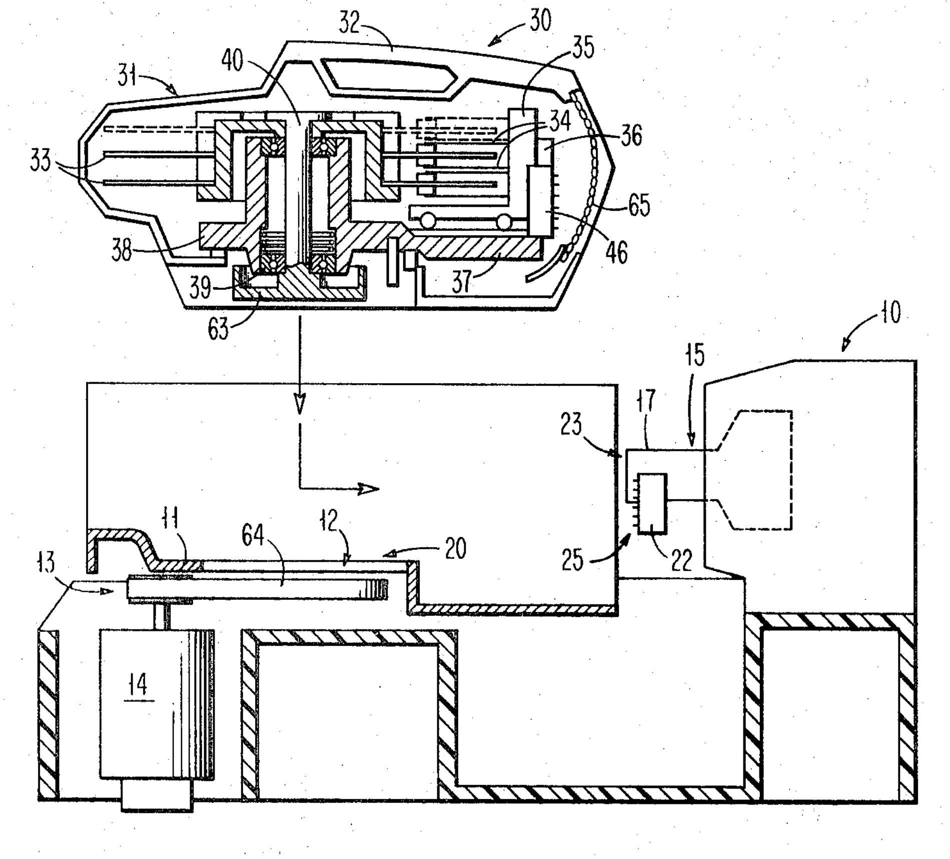
FIG. 6 is a section view of a portion of the drive and the data module.

The data module 30, as illustrated diagrammatically in FIGS. 2 and 3 and in section view in FIG. 6, includes an interchangeable sealed cartridge 31, preferably formed of a plastic, and encloses at least one rotary magnetic disk 33, magnetic transducers 41 carried on accessing magnetic head arms 34, a carriage 35 for supporting the head assemblies, a spindle assembly 40 and appropriate electronics. The data module is coupled to the drive through a first mechanical interface 20, a second mechanical interface 23 and an electrical interface 25.

Within the data module the spindle assembly 40 is supported by an upstanding support portion 38 of a base plate casting 37. Bearing assemblies 39 in the support portion 38 allow the spindle to freely rotate. Seated on a hub portion (not shown) of the spindle 40 are one (FIG. 2), two (FIG. 3), or more magnetic disks 33. As will be later described, the number of magnetic disks defines the class of the data module. The lower portion of the spindle outside the cartridge enclosure serves to connect the data module through a mechanical coupler 13 to the drive motor 14 of the disk drive and forms part of the first mechanical interface 20. For example, the driven portion of the spindle 40 may be a pulley 63 and the mechanical coupler 13 may be a belt mechanism 64 set below an opening 12 in the top surface of the tray. The particular details of the coupling at the first mechanical interface between the data module receiving means and the data module along with the associated hardware is specifically shown and described in the previously cited copending patent application, Ser. No. 206,688, "Magnetic Disk Storage Apparatus," to R. W. Lissner and R. B. Mulvany.

Also enclosed within the module is the carriage 35 which is supported on base plate 37. The carriage moves in a direction substantially radially with respect to the central axis of the spindle. The carriage supports an appropriate coupling portion 36 which extends through an apertured opening 65 in the side wall of the cartridge which may be sealed. The coupling portion 36 of the carriage is designed to mate with an output shaft 17 of the accessing drive motor 15 within the universal drive serving to connect the carriage to the actuator, and this is designated the second mechanical interface 23. The second mechanical interface is completely described and claimed in copending patent application Ser. No. 303,748 entitled "Actuator-Carriage Coupling" and filed in the name of C. P. Barnard et al. The rigid accessing head arms 34 are firmly attached to the carriage so as to suspend the magnetic transducers 41 in transducing relationship over the magnetic surface of the disk. A single transducer is shown associated with each arm. However, several transducers can be so suspended so as to decrease access time in moving from track to track thus improving system performance. Two arms are thus utilized to enable the transducers to transduce information on both sides of each disk. Electrical conductor means 42 connect each transducer 41 to selected pins on an electrical connector 46 disposed on the base plate 37 or mounted to the side wall of the cartridge 31 to conduct signals to or from the transducer. The connector 46 cooperates with a corresponding connector receptacle 22 in the universal drive to form the first electrical interface 44. The head assemblies may include one servo head that affords track following of the data tracks.

The drive motor 15 and its associated voice coil positioning assembly 16 which linearly moves the carriage bidirectionally so as to position the selected transducer at the desired track is controlled by a motor positioning controller 18 which receives position control signals over a control line 19 from an associated control unit 60. The control unit position 60 is generally contained in the universal disk drive although it is recognized that there may be two physically separate units.

The positioning controller 18 also receives an electrical servo head position signal through a conductor 21 from the electrical connector receptacle 22 disposed at the upper portion of the module receiving or shroud region on the inner periphery of the drive. Also connected to selected pins on the receptacle 22 are the conductors diagrammatically designated by the numeral 24 from the read/write select circuitry 26 providing information from the read/write line 28 and the control line 29 and from the conductors 54, 55 and 56 which provide information regarding the module identification through module identifier line 27 and the logic network 57. Appropriate signals are applied on these lines from the previously described control unit portion 60 of the disk drive facility.

In order to connect the data module to the drive, the operator by means of handle 32 lowers the module into the shroud 11 with the lower portion of the spindle 40 protruding through the opening 12 in the tray 11 of the drive and into precise engagement with the mechanical coupler 13, so as to form the first mechanical interface 20. Once the module is seated in the desired alignment the apertured opening of door 65 is opened and the data module is moved horizontal to cause the coupler 36 to move into position to be accepted by and locked to a mating portion of the shaft 17, thus effecting the second mechanical interface 23. Movement of the data module 30, and accordingly of the connector 46, causes the connector 46 to firmly engage and mate with receptacle 22 so as to form the electrical interface 25.

Figure 4:
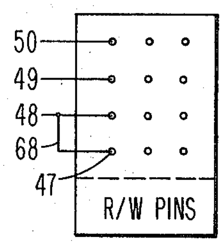
FIG. 4 is an elevational view of the connector comprising the electrical interface between the drive and the module from within the data module.
Figure 5:
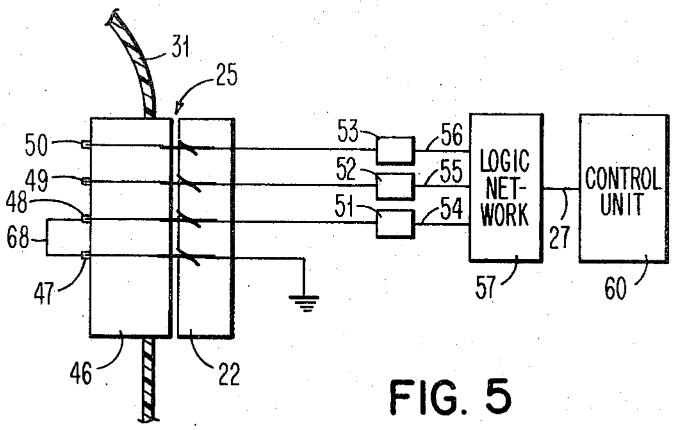
FIG. 5 is a diagrammatic view of the electrical interface between the drive and the module.

Another feature of this invention is the automatic sensing of the storage capacity, e.g., number of magnetic surfaces, of the data module that is connected to the disk drive. Referring now to FIGS. 4 and 5, the preferred structure for indicating the class of data module and the means for sensing the indication are shown.

Connector 46 is mounted within each data module on the baseplate or on the side wall of the cartridge. Selected pins of the connector are reserved for identifying the class of the module and specific interconnections between any two of these reserved pins indicates the class of the module. The remaining pins on the connector may be used for interconnecting the transducers and the read/write circuitry and the servo circuitry, if used. As illustrated, the specific interconnection, by a conductor 68, between active pin 48 and pin 47, which is grounded, indicates that the module has a single disk and a first storage capacity, for example, 12 megabytes. The interconnection conducts the appropriate predetermined voltage level through sense line 54, one of the respective sense lines 54, 55 or 56, to a logic network 57 in the drive, which senses and interprets the voltage signal as the one-disk class of the data module, and provides coded information in the form of bits over line 27 to the control unit 60. The unconnected reserved pins 49 and 50 do not transmit the predetermined voltage to the drive. The control unit is programmed to insure that only instructions applicable to the connected class of data module are executed during machine operation. Filter circuits 51, 52 and 53 integrate the sensed signals to filter out noise, which may be introduced on the sense lines from, for example, contact bounce. If the interconnection is between pins 49 and 47, a two-disk 36 megabyte storage capacity is indicated and if the interconnection is between pin 50 and ground, a three-disk 72 megabyte capacity is indicated. Any number of pin interconnections can be utilized to indicate a multiplicity of classes of data modules.

In an alternate embodiment of identifying the data module, the underside of the module may include a selective pattern of pins, illustrated by the dashed lines and designated by the numeral 70 in FIG. 3. When the module is connected to the drive, these pins will trigger the appropriate microswitch sensor 71, shown by the dashed lines in FIG. 1 matingly disposed within the drive, thus closing a predetermined logic circuit whereby an appropriate signal is transmitted to the control unit.

In a third embodiment, an operator, prior to placing the module in the drive may set a series of toggle switches located on an indicating panel of the drive frame in predetermined positions so as to indicate the class of the module.

In a fourth embodiment, the data module includes an optical readable pattern on the outside surface where the pattern contains the information regarding the number of disks contained in that data module. An optical reader is mounted within the universal drive to detect and decode the optical pattern on the data module mounted on the drive. This decoding circuitry then transmits the information to the control unit as discussed in the first embodiment.

As previously discussed a data module may include a different number of magnetic disks. The number of disks that the module contains denotes the class of the module. For example, in a first class the data module comprises a single magnetic disk with the transducers accessing both sides of the disk. A second class comprises two magnetic disks and a third class comprises three magnetic disks. The storage capacity of the three respective classes may be 12, 36 and 72 megabytes with one of the disk surfaces containing servo position information. Each data module has the same physical size. The storage capacity of the modules may be changed by adding more magnetic disks and head arm assemblies as shown by the dashed lines in FIG. 6. Many additional classes may similarly be described.

The plurality of all classes of data modules with the same first and second mechanical interfaces and an electrical interface that is similar except as to means indicating or identifying the module and with the same common fixed spatial relationship between the three interfaces comprises a family of data modules.

Since the three interfaces 20, 23 and 25 are in the fixed specific relationship, all data modules within any class are interchangeable with data modules of the same class and with any other class. Each and every disk drive contains precisely the same spatially fixed mating portions of the modules so as to effect the necessary interfaces. Thus, the single universal disk drive is able to receive any one of the family of data modules, thereby providing a multiplicity of selective storage capacities.

In an alternate embodiment, the actuator or carriage drive motor may be located within the data module. Accordingly, the mechanical interface between the actuator and the carriage is eliminated. However, an electrical interface is then created since electrical energy must then be transmitted from the drive to the motor. This interface preferably includes a second pair of mating connectors/receptacles similar to the first electrical interface heretofore described. In this alternate embodiment the accessing arm may be moved angularly to the desired track as described in copending patent application, Ser. No. 231,320 entitled "Magnetic Disk Apparatus," by D. E. Cuzner et al.

In another embodiment, only selected magnetic surfaces of several magnetic disks may be dedicated to magnetic memory storage. It follows that corresponding magnetic head arm assemblies may be eliminated from the data module so as to reduce cost. In another modification, a fixed head assembly may be permanently mounted within the module in a transducing relation with desired tracks on one or more magnetic surfaces. Thus, the accessing distance required of the accessing heads is reduced and system performance is increased.

Accordingly, a random access system utilizing a family of data modules has been described, the data modules being interchangeable between any drive and sealed in nature so as to protect the magnetic disk surface by reducing outside contamination. By providing the read/write heads within the data module, the heads are dedicated to assigned tracks or surfaces so that each head will read only the data that it wrote, thus improving reliability.

While there has been described what are, at present, considered to be the preferred embodiments of the invention, it will be understood that various modifications may be made therein, and it is intended to cover in the appended claims all such modifications as fall within the true spirit and scope of the invention.

What is claimed is:

1. A random access storage system employing a family of data modules, said family being comprised of a plurality of different classes of data modules where each class is defined by the number of magnetic disks within the data modules associated with that class, all data modules within any class being interchangeable with data modules of the same class and with each and every data module of all other classes of said family, comprising in combination:

a universal disk drive for connecting to all data modules within said family of data modules, said universal disk drive having a sensing means;

and a data module of said family of data modules connected to said universal disk drive to effectively form said random access storage system, said data module including means for indicating the number of magnetic storage disks within said data module and for coacting with said sensing means within said universal disk drive for transmitting a signal indicative of the number of magnetic storage disks within said data module to said universal disk drive.

2. The random access storage system as set forth in claim 1 wherein said data module comprises:

first and second mechanical interfaces and an electrical interface, the three interfaces being in a specific spatial relationship to each other, at least one magnetic disk, transducing means for transducing information on each of said magnetic disks, accessing means for moving said transducing means to a selected position with respect to said magnetic disk, and a drive spindle means on which said at least one magnetic disk is mounted.

3. The random access storage system as set forth in claim 2 wherein said universal disk drive comprises:

means coupled to said data modules as said first mechanical interface for rotatably driving said spindle means;

means mechanically coupled to said data modules at said second mechanical interface for selectively energizing said accessing means; and means coupled to said data modules at said electrical interface for electrically energizing said transducing means.

4. A random access storage system employing a family of data modules, said family being comprised of a plurality of different classes of data modules where each class is defined by the number of magnetic storage disks within the data modules associated with that class, all data modules within any class being interchangeable with data modules of the same class and with each and every data module of all other classes of said family, comprising in combination:

a universal disk drive for connecting to all data modules within said families of data modules;

a data module of said family of data modules connected to said universal disk drive to effectively form said random access storage system;

said data module comprising:

first and second mechanical interfaces and an electrical interface, said three interfaces being in a specific spatial relationship to each other, said electrical interface being comprised of an electrical plug having a plurality of pins;

at least one magnetic disk;

transducing means for transducing information to and from each of said magnetic disks;

accessing means or moving said transducing means to a selected position with respect to said magnetic disk;

a drive spindle means on which said at least one magnetic disk is mounted; and indicating means for indicating the number of magnetic storage disks within said data module wherein said indicating means is comprised of specific designated ones of said pins of said electrical interface, at least two of said specific pins being uniquely connected for each class of data modules wherein said family of data modules so as to indicate the class of data modules of said data module; said universal disk drive comprising:

means mechanically coupled at said first mechanical interface for rotatably driving said spindle means;

means mechanically coupled to said data modules at said second mechanical interface for selectively energizing said accessing means;

means coupled to said data modules at electrical interface for electrically energizing said transducing means; and sensing means for sensing said indicating means of said data module connected to said universal disk drive.

5. A random access storage system employing a family of data modules, said family being comprised of a plurality of different classes of data modules where each class is defined by the number of magnetic storage disks within the data modules associated with that class, all data modules within any class being interchangeable with data modules of the same class and with any data modules of any other class, including a universal disk drive for connecting to any data module of said family of data modules to effectively form said random access storage system, said universal disk drive having means sensing indicating means within each data module of said family of data modules when said data module is connected to said universal disk drive for identifying the class of said connected data module.

* * * * *